March 5, 1968      E. C. DOME      3,371,359

MATTRESS SUSPENSION SYSTEM

Filed Sept. 22, 1966      2 Sheets-Sheet 1

INVENTOR
EDWIN C. DOME

BY *Oberlin, Maky & Donnelly*
ATTORNEYS

March 5, 1968      E. C. DOME      3,371,359
MATTRESS SUSPENSION SYSTEM
Filed Sept. 22, 1966      2 Sheets-Sheet 2
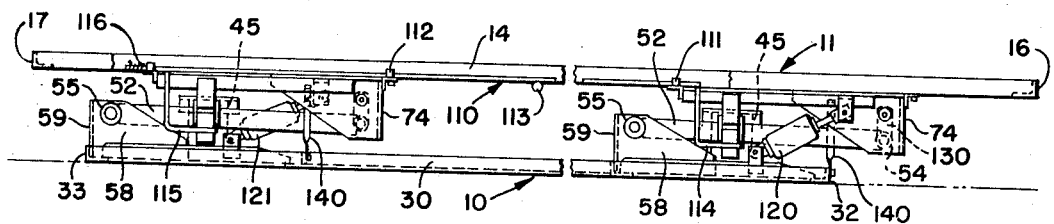
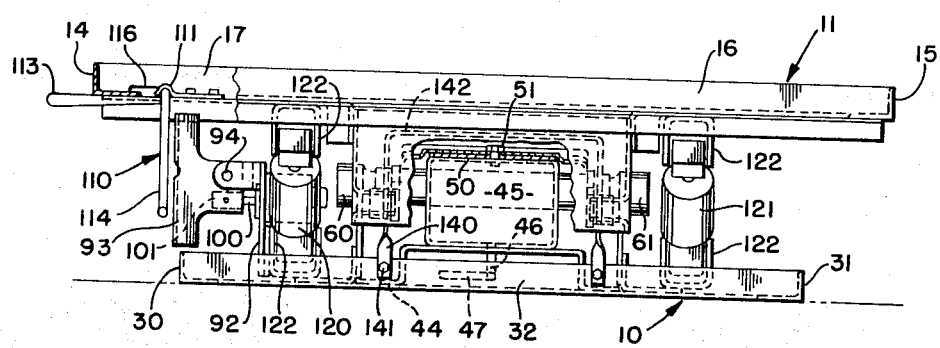
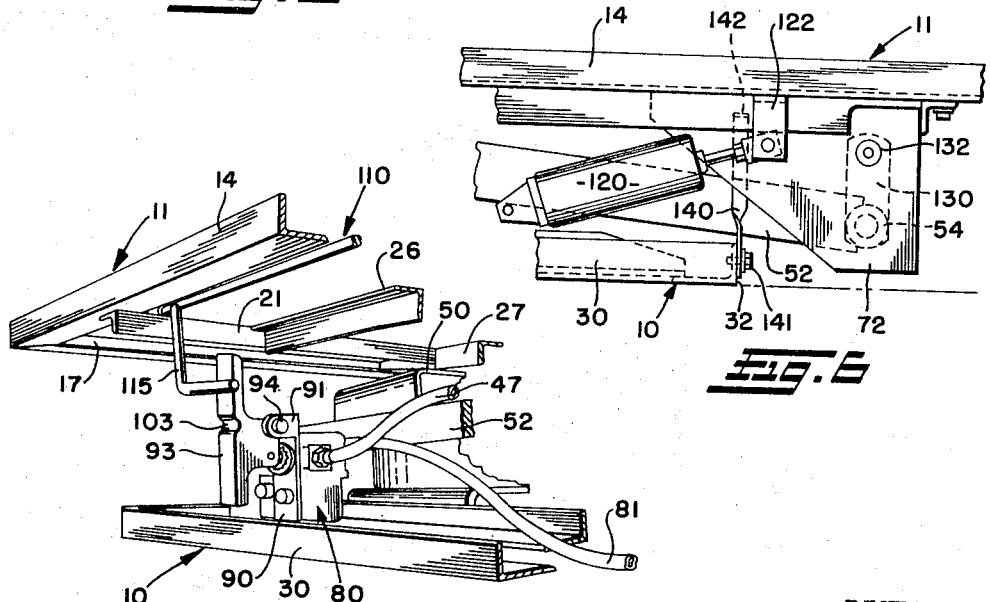
INVENTOR
EDWIN C. DOME
BY *Oberlin, Maky & Donnelly*
ATTORNEYS United States Patent Office 3,371,359
Patented Mar. 5, 1968

3,371,359
MATTRESS SUSPENSION SYSTEM
Edwin C. Dome, Lucas, Ohio, assignor to Artnell Company, Chicago, Ill., a corporation of Delaware
Filed Sept. 22, 1966, Ser. No. 581,324
9 Claims. (Cl. 5—118)

The present invention relates as indicated to a mattress suspension system particularly designed for advantageous use in moving vehicles such as, for example, trucks or like vehicles.

In the indicated environment it is desirable, and it has become common practice, to provide a sleeping compartment in the truck in which a mattress or the like can be placed upon which the driver may recline. Where the truck is being driven by a single driver, no particular problem is encountered since, in order to obtain the desired rest, the truck is necessarily stationary when the driver is sleeping. However, in order to substantially increase the number of hours of operation of the truck to meet rigid delivery schedules, two drivers are frequently assigned to a single vehicle, with one of the drivers resting while the other is driving. As will be appreciated, attempting to sleep under driving conditions can be difficult, particularly when rough road conditions are encountered.

Attempts have been made in the past to provide supplementary supporting means for mattresses or the like in order to provide a more comfortable supporting surface and one which is relatively more immune to rough road conditions. However, these supplementary supporting arrangements have been less than completely satisfactory for a number of reasons, including the lack of simple and easily operable control means to automatically accommodate persons of varying weights.

With the above in mind, a primary object of the present invention is to provide a mattress suspension system which is automatically vertically adjustable responsive to simple lever manipulation by the person using the same thereby to vertically position the mattress to provide optimum comfort for that particular person.

A further object of the present invention is to provide such a mattress suspension system which includes a pair of pneumatic suspension units positioned relatively adjacent the opposite ends of a fixed supporting frame, with each of such suspension units being controlled by the user in a manner simultaneously to raise or lower both ends of the mattress and support therefor.

A further, more specific object of the present invention is to provide such a mattress suspension system which can be adjusted while the user is in a reclined position on the mattress. In accordance with the present invention, the user, when reclining, can simply actuate a control arm operatively controlling the noted suspension units.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 3 is a side elevational view of the invention;

FIG. 4 is an end elevational view of the invention;

FIG. 5 is an enlarged, fragmentary perspective view of one end of the unit, showing more clearly the arrangement and cooperation of the control arm and the control valves, and FIG. 6 is a fragmentary, enlarged view of a portion of FIG. 3.

Figure 1:
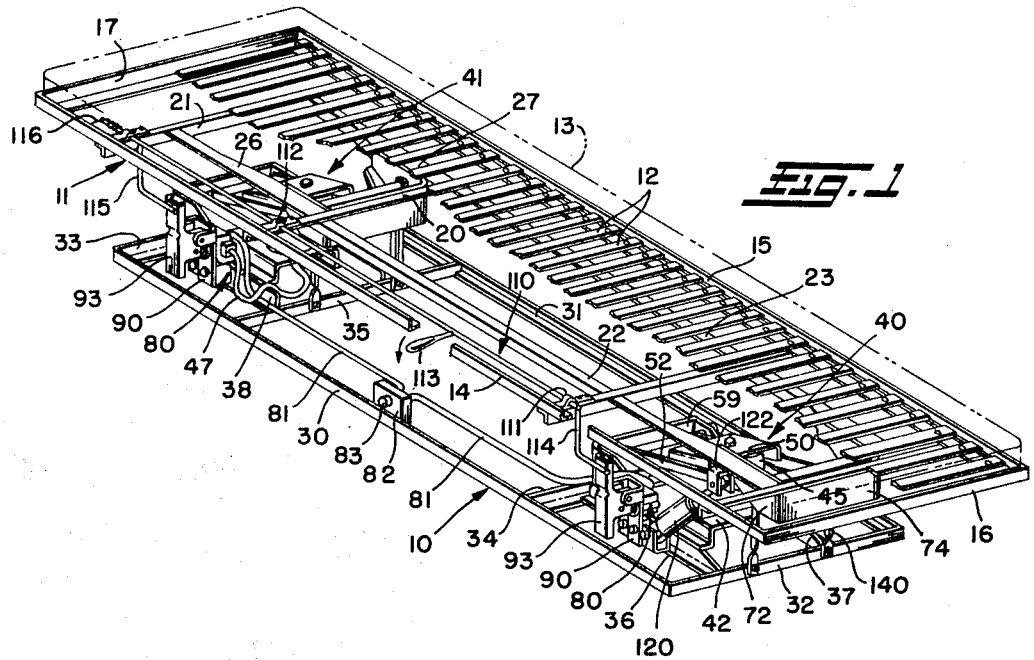
FIG. 1 is a perspective view of the mattress suspension system of the present invention, with certain portions being broken away in order to expose certain of the system components, and the mattress being shown in dashed lines.

Referring now in more detail to the drawings, wherein like parts are indicated by like reference numerals, and initially to FIG. 1, the mattress suspension system of the present invention includes lower and upper support frames generally indicated at 10 and 11, respectively. The upper support frame 11 receives in any suitable manner a plurality of supporting straps fragmentarily shown in FIG. 1 and commonly designated at 12, which in turn support mattress 13, shown in dashed lines in this figure. It will be understood that the straps 12 are arranged and mounted to form a unit and extend completely across the width of the top supporting frame 11 and are supported along each longitudinal side thereof.

In the form shown, the upper support frame 11 includes longitudinally extending angle members 14 and 15, and transversely extending angle members 16 and 17 suitably connected thereto to provide a rigid, rectangular unit. The upper frame further includes transversely extending, longitudinally spaced angle members 18, 19, 20 and 21. Reinforcing channels 22 and 23 extend between and are rigidly connected to the transverse members 19 and 20 for reinforcing the upper frame in the central region thereof. In addition, angle members 24 and 25 extend between the transverse members 18 and 19 and are rigidly secured thereto by means such as welding or the like. In addition to reinforcing the upper frame assembly 11 in such region, the members 24 and 25 function to operatively connect the suspension unit immediately therebelow to the upper frame, as will be discussed in more detail hereinbelow. Similar angle members 26 and 27 are rigidly connected to the transverse angle members 20 and 21 at the opposite end of the upper frame.

The lower support frame 10 is of similar construction comprising longitudinal angle members 30 and 31, and transverse angle members 32 and 33 rigidly secured thereto to form a rectangular frame assembly. Additional transverse angle members 34 and 35 are provided which extend between the longitudinal members 30 and 31 intermediate the length thereof. Angle members 36 and 37 extend between the angle members 32 and 34 for supporting the adjacent suspension unit, as will be described, and similar angle members 38 and 39 extend between the transverse members 33 and 35.

A pair of air suspension units general'y indicated at 40 and 41 are operatively interconnected between the lower and upper frames 10 and 11, respectively, for vertically adjusting the latter relative to the former. The suspension units 40 and 41, it will be noted, are positioned relatively adjacent the ends of the respective frames and are adapted to be simultaneously actuated in a manner to be presently described.

The air suspension units 40 and 41 are substantially identical, with one exception hereinafter noted, and the description of one will accordingly suffice for both. Where appropriate, like reference numerals have been applied. Referring to the air suspension unit 40, the same comprises a supporting base 42 formed with laterally directed bottom flanges 43 and 44, FIG. 4, rigidly secured to the frame angles 36 and 37 by any suitable means such as, for example, welding. An air spring 45 is mounted at its lower end on the base 42, with the latter being provided with an opening through which the valve fitting 46 of the air spring extends for suitable connection to air line 47.

The upper end of the air spring 45 is operatively connected to a U-shaped top plate member 50 by means of bolt 51, with the sides of the top plate 50 being rigidly connected to arms 52 and 53 rigidly attached at their opposite ends to sleeves 54 and 55. Sleeve 55 is telescopically received around shaft 56 which extends through the sides 57 and 58 of an upright frame member 59 suitably fixed to the lower frame 10, for example by rigid connection to the transverse angle 34 and the angle members 36 and 37. The opposite ends of the shaft 56 are journaled in cylindrical bearings 60 and 61 mounted on the sides 57 and 58. It will thus be seen that the sleeve 55, and thus the arms 52 and 53, freely pivot about the axis through the shaft 56 responsive to inflation or deflation of the air spring 45.

In the air suspension unit 41, the sleeve 54 is journaled on bearing shafts 70 and 71 carried by the sides 72 and 73, respectively, of an upright movable frame member 74. The latter can be rigidly secured to the upper frame 11 by any suitable means, for example by welding the same to the upper transverse angle 18 and the longitudinally extending angle members 24 and 25. In this manner, inflation or deflation of the air spring 45 is transmitted to vertical movement of the upper frame 11 and the mattress carried thereby. In the air suspension unit 40, the sleeve 54 is operatively connected to the upper frame in a slightly different manner, as will be specifically described below when particular reference is made to FIG. 6.

Referring now to the manner in which the air springs 45 are simultaneously actuated, the air hoses 47 leading to each of the fluid springs 45 are operatively connected at their opposite ends to control valves commonly and generally indicated at 80 mounted on the lower frame 10. Each of the control valves 80 receives a second fluid line 81 the opposite end of which is mounted to a hose block 82 carried by the lower frame 10. An air fitting 83 is mounted on and extends laterally from the hose block for suitable connection to a source of compressed air. In this manner, both of the air springs 45 can be simultaneously inflated from a single air source so as to raise both ends of the upper frame 11 supporting the mattress 13. In a manner to be presently described, the air springs 45 are similarly simultaneously deflated for evenly lowering the upper frame 11 and mattress 13.

Figure 2:
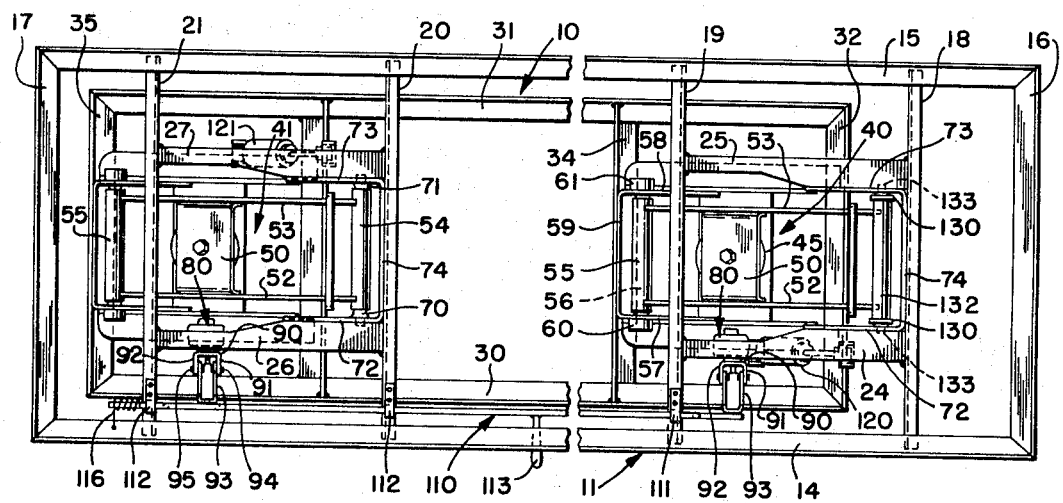
FIG. 2 is a fragmentary plan view of the invention, with the mattress being omitted from this figure.

As best seen in FIG. 5, a bracket 90 is mounted to the lower frame 10 immediately outwardly of each of the control valves 80. Each bracket 90 is provided with outwardly extending arms 91 and 92 at the top thereof for pivotally mounting a valve rocker arm 93. The latter is generally U-shaped in cross-section, with the central region thereof being relatively enlarged and formed with apertures at a corner thereof adapted to be aligned with openings formed in the arms 91 and 92 of the bracket 90. Referring to FIG. 2, pivot pins 94 and 95 extend through the thus aligned openings for pivotally mounting the rocker arm. A similar rocker arm is mounted at the opposite end of the unit adjacent the other control valve 80, with the arm and mounting therefor being designated by corresponding reference numerals.

As best seen in FIG. 4, each control valve 80 includes a valve stem 100 which is adapted to be engaged by a stem block 101 carried by the rocker arm 93, with the stem block 101 serving to engage the valve stem 100 and depress the same inwardly of the valve 80 when force is applied to the rocker arm to bias the same counterclockwise about the pivotal axis thereof through the pins 94 and 95. Alternatively, the rocker arm 93 is moved away from the valve stem 100 when the rocker arm is caused to rotate clockwise about its pivotal mounting. Each rocker arm is formed with a cutout or recess portion 103 which functions in a manner to be presently described to retain the rocker arm in a neutral position.

A control arm generally indicated at 110 is carried by the upper frame 11 and functions to actuate the rocker arms 93 to control the valves 80 and the degree of inflation of the air springs 45. In the form shown, the control arm 110 is journaled in bearing blocks 111 and 112 carried by the transverse upper frame members 19 and 20, respectively. The arm 110 includes a handle 113 and downwardly depending L-shaped end portions 114 and 115 the free ends of which extend into the plane of the rocker arms 93. A return spring 116 is operatively interconnected between the upper frame and the end of the control arm remote from the handle 113 for returning the control arm to its FIG. 1 position following actuation thereof.

Shock absorbers 120 and 121 are operatively connected at opposite sides of the unit between the stationary, lower frame 10 and the upper, movable frame 11 in order to dampen the movement of the latter, in a conventional manner. The shock absorbers can be mounted in any satisfactory manner on the respective frames, for example by U-shaped brackets commonly designated at 122 which are suitably secured to the respective upper and lower frames.

It should be noted that the upper frame 11 moves longitudinally a slight degree during ascension and descension thereof, in response to pressure regulation of the air springs 45, due to the arcuate path defined by the ends of the arms 52 and 53 operatively attached to the upper frame. Referring to FIG. 6, such movement is accommodated in the suspension unit 40 by means of a pair of link members commonly designated at 130 pivotally mounted at their lower ends to the sleeve 54, with the latter terminating free of the sides 72 and 73 of the movable frame member 74 to permit swinging movement of the sleeve relative thereto. The upper ends of the links 130 are pivotally connected to pivot shaft 132 having reduced opposite ends carried by sides 72 and 73. It will thus be seen that the links 130 permit longitudinal movement of the upper frame 11 relative to the fixed pivot of the arms 52 and 53 of the suspension unit 40, with the latter unit actually being responsive to the longitudinal movement of the upper frame resulting from actuation of the suspension unit 41, specifically, the pivotal movement of the arms 52 and 53 thereof.

In order to limit the vertically upward movement of the upper frame 11, straps commonly designated at 140 are provided associated with the suspension units 40 and 41. As best seen in FIGS. 4 and 6, the straps are generally U-shaped, with the legs thereof being mounted by bolts 141 or the like to the lower frame 10. The base 142 of each strap extends horizontally beyond the arms 52 and 53 so that the ascension of the latter is arrested when the arms ascend to contact the base 142.

The manner in which the air springs 45 can be automatically regulated by the person reclining on the mattress 13 should be apparent from the above. The handle 113 of the control arm 110 is moved downwardly. Depending upon the position of the upper frame 11 relative to the lower frame 10, which will of course depend on the weight of the person, the ends 114 and 115 of the control arm will strike the rocker arms 93 either above or below, respectively, the neutral positions thereof, which comprise a horizontal plane through the axis of the pivot pins 94 and 95. For example, assuming the control arm 110 and upper frame 11 are in the positions thereof illustrated in FIGS. 1 and 5 when the person is reclined, actuation of the control arm 110 by depressing the handle 113 will result in the control arm ends 114 and 115 engaging the upper regions of the rocker arms 93 and biasing the same clockwise about the pivotal mounting thereof. This will result, as described above, in a release of the valve stems 100 of the control valves 80 thereby exhausting air from the air springs 45 through the valves. The deflation of the air springs as a result of such exhaustion will result in a lowering of the upper frame 11, with such lowering continuing until the ends 114 and 115 of the control arm 110 are vertically positioned proximate the notches or recesses 103 formed in the rocker arms 93, in which position the valve stem 100 will be biased inwardly by the stem block 101 sufficiently to shut off the exhaust of air. In this "neutral" position of the upper frame 11, any force applied to the control arm through the lever 113 will be ineffective to pivot the rocker arms 93 about their pivotal connections. The upper frame 11 will accordingly stay in such position as long as the person for whom the upper frame has been adjusted remains in reclined position thereon. It will be apparent that the amount of air exhausted from the air springs will depend upon the weight of the person, with the neutral position of the upper frame providing optimum resilient support for that particular individual.

If the upper frame 11, when the user positions himself on the mattress 13, is in its FIG. 4 position, the ends 114 and 115 of the control arm when the latter is actuated will strike the rocker arms 93 below the neutral position provided by the notched areas 103. When the upper frame 11 is in such position, actuation of the handle 113 downwardly by the reclined person will serve to effect countereclockwise movement of the rocker arms 93 about the pivotal axis through the pins 94 and 95. As a result, the valve stems 100 will be depressed inwardly of the control valves 80 thereby conditioning the same to receive pressurized air from an air source suitably connected to the fitting 83. The pressurized air passes through the control valves 80 to the air springs 45 as described thereby serving to inflate the air springs and thus move vertically upwardly the upper frame assembly 11. It will be noted that the air springs 45 are located generally intermediate the ends of the arms 52 and 53 with the result that the upper frame assembly 11 can travel approximately double the vertical expansibility of the fluid springs 45.

When the air springs 45 are inflated as thus described, the raising of the upper frame 11 will result in the gradual raising of the ends 114 and 115 of the control arm 110, with such ends eventually coming into alignment with the notches or recesses 103 and thereby restoring the control valves 80 to a neutral position. Inflation of the air springs 45 is thereby abated and the upper frame and mattress carried thereby will remain at such adjusted height. In the situation just described, then, inflation of the air springs 45 was needed to provide optimum resilient support for that particular user. It will also be apparent that the inflation of the air springs in this instance is similarly directly dependent on the weight of the reclined person.

It will thus be seen that in accordance with the present invention, the upper frame and mattress carried thereby is automatically leveled regardless of the weight of the individual. For a relatively light person, the neutral position of the upper frame is reached with less inflation required of the air springs 45. Conversely, when a relatively heavy person is supported by the suspension unit, the predetermined optimum level of support is reached responsive to a relatively greater degree of inflation of the air springs 45. The air springs are simultaneously inflated or deflated, and both ends of the upper frame 11 are thus evenly raised or lowered, with the movement of the upper frame being dampened by the shock absorbers 120 and 121. The resilient suspension of the upper frame 11 by the air springs provides a smooth ride and substantially isolates the upper frame 11 and mattress carried thereby from the rough road conditions.

Other modes of applying the principle of the invention may be employed, change being made as regards the details described, provided the features stated in any of the following claims or the equivalent of such be employed.

I therefore particularly point out and distinctly claim as my invention:

1. A mattress suspension system and the like comprising a lower frame, an upper frame adapted to receive and support a mattress or the like, at least two fluid suspension units operatively connected between said lower and upper frames for vertically controlling the position of the latter relative to the former, each of said fluid suspension units including an air spring, valve means carried by said lower frame for each suspension unit controlling the fluid pressure within said air springs, and single control means accessible to a person reclining on said mattress for actuating said valve means simultaneously to automatically vertically adjust said upper frame depending upon the weight of the person thereby to provide controlled, level movement of said upper frame relative to said lower frame.

2. The combination of claim 1 wherein said control means for actuating said valve means comprises a control arm pivotally carried by said upper frame, said control arm having mounted thereon a control handle for actuating said arm, and means operatively interposed between said control arm and said valve means responsive to actuation of said control arm for controlling the said valve means and thus the fluid pressure within said air springs.

3. The combination of claim 2 wherein said means operatively interposed between said control arm and said valve means comprises rocker arm means pivotally mounted relative to said lower frame, said control arm engaging said rocker arm means to condition said valve means for inflation or deflation of said air springs.

4. The combination of claim 1 wherein said valve means comprises a pair of control valves each of which is associated with a source of pressurized air and an air spring for controlling the fluid pressure within the latter, said control means for actuating said valve means comprising a control arm pivotally carried by said upper frame, and a pair of rocker arms pivotally mounted relative to said lower frame and adapted to be actuated by said control rod to condition said control valves for inflation or deflation of said air springs.

5. The combination of claim 4 wherein said rocker arms are mounted for pivotal movement about a horizontal axis, with said control arm including downwardly depending portions adapted to engage said rocker arms above or below a horizontal plane through the pivot points of said rocker arms, the movement of said rocker arms by said control arm clockwise about said pivot points serving to exhaust said air springs through said control valves, and pivotal movement of said rocker arms counterclockwise about said pivot points thereof by said control arm serving to operatively interconnect said air springs with said source of pressurized air thereby inflating said air springs.

6. The combination of claim 5 wherein each of said rocker arms is formed with a recess approximately in the same horizontal plane as the pivot point thereof, the adjacent depending portion of said control arm when in said notch being ineffective to rotate the associated rocker arm.

7. The combination of claim 5 further including means for returning said control arm to a predetermined position in which the depending ends thereof are out of contact with said rocker arms, and shock absorber means operatively interconnected between said lower and upper frames for dampening the movement of the latter relative to the former.

8. The combination of claim 1 wherein each of said fluid suspension units comprises generally upright frame members rigidly mounted respectively to said lower and upper frames, and a pair of arms pivotally connected at opposite ends thereof to said upright frame members, the upper end of each of said air springs being operatively connected to said arms whereby movement resulting from expansion or contraction of said air springs as controlled by the fluid pressure therewithin is transmitted through said arms to said upper frame.

9. The combination of claim 8 wherein each said air spring is operatively connected to said arms at approximately midway between the ends thereof whereby the movement of said upper frame is approximately double the expansion or contraction of said fluid spring.

References Cited

UNITED STATES PATENTS

| 1,664,129 | 3/1928 | Pallenberg | 5—278 XR |
| 2,485,199 | 10/1949 | Holtzman | 5—246 |
| 2,769,182 | 11/1956 | Nunlist | 5—72 XR |
| 3,299,447 | 1/1967 | Dome | 5—118 |

BOBBY R. GAY, *Primary Examiner.*

RAYMOND D. KRAUS, *Assistant Examiner.*